United States Patent [19]

Graham et al.

[11] Patent Number: 4,467,498
[45] Date of Patent: Aug. 28, 1984

[54] ROTARY VISCERA HARVESTER

[75] Inventors: Johnny R. Graham, Gainesville; Kenneth Z. Graham, Dawsonville, both of Ga.

[73] Assignee: Cantrell Machine Co., Inc., Gainesville, Ga.

[21] Appl. No.: 553,508

[22] Filed: Nov. 21, 1983

[51] Int. Cl.$^3$ .............................................. A22C 21/06
[52] U.S. Cl. ........................................... 17/45; 17/11
[58] Field of Search ..................................... 17/11, 45

[56] References Cited

U.S. PATENT DOCUMENTS

1,798,585  3/1931  Bookheim ............................... 17/11
4,019,222  4/1977  Scheier et al. ........................... 17/11

Primary Examiner—Willie G. Abercrombie
Attorney, Agent, or Firm—Julian W. Dority

[57] ABSTRACT

An apparatus and method are disclosed for pulling out and separating the viscera from a fowl carcass during food processing. The apparatus includes a rotary carrier (B) on which are carried a plurality of gripping devices (A). A rotary axis (35) of the rotary carrier (B) mounted on a frame (70) is inclined to the horizontal at such an angle that the gripping devices (A) penetrate the cavities (24) of fowl carcasses (F) conveyed sequentially past the frame (70). The gripping device (A) includes serrated gripping jaws (10, 14) which clamp a viscera track (18) between the crop and stomach. The jaws are carried by spoke arms (48) carried radially on a hub (36) forming the rotary carrier (B). A spring (61) closes the jaws and cam plates (62, 63) open the jaws through a cam roller (64). Cam roller (64) pushes forward a rack gear (58) to open the jaws via a rotary shaft (54) having a jaw (14) affixed thereto. The carrier (B) and gripping devices (A) are driven in synchronism with an overhead conveyor (116) on which the fowl carcasses are carried. The gripping jaws (A) are closed and begin insertion at about four-o'clock. The jaws open at about five-o'clock when cam (62) is engaged and close at about the six-o'clock position when spring (61) is released after cam (62) is past over. The viscera track (18) is positively clamped between the jaws. During retraction, about six to eight-o'clock, the viscera is harvested by complete removal from the carcass which continues its travel on the conveyor. At about the eight-o'clock position, and after retraction, cam (63) is engaged again opening the jaws to release the harvested viscera.

27 Claims, 5 Drawing Figures

ROTARY VISCERA HARVESTER

BACKGROUND OF THE INVENTION

The present invention relates to the harvesting of the viscera from the carcass of a chicken so that the viscera is completely removed from the chicken during food processing.

In the processing of fowl such as chickens, the viscera is pulled by a machine typically referred to as an eviscerator from the interior cavity of the chicken so that it hangs outside the chicken. Prior eviscerators for pulling the viscera from the interior cavity of the fowl without separation from the carcass are shown in U.S. Pat. Nos. 4,262,387; 3,685,096; and Re. 28,666. Each of the eviscerators includes a tool for scooping and pulling the viscera out of the carcass to a position where the viscera hangs on the outside of the carcass. There is no harvesting by complete separation from the carcass by these devices. In the overhanging position, the viscera is visible for inspection and the gizzard and liver may be harvested. After the liver and gizzard have been harvested, it has been typical to cut the viscera below the stomach and then remove the remaining viscera by hand.

The prior methods of finally separating viscera from the carcass have been limited to manual processes.

However, the process of finally removing the viscera by manual operation is one which requires much labor. This also requires that further labor be spent further down the processing line to remove the crop which has been left after the viscera has been severed below the stomach. This process for removing the crop after the viscera has been removed requires that the attendant pull the neck down and grasp the crop with his index and third fingers which is a very tedious and labor intensive process.

Accordingly, an important object of the present invention is to provide an apparatus and method for the automatic harvesting, by complete separation from the carcass of a fowl, the viscera of the fowl which has been pulled out of the interior cavity and left in an overhang position during food processing.

Another important object of the present invention is to provide apparatus and a method for automatically removing the viscera including the crop and esophagus.

Still another important object of the present invention is to provide an apparatus for automatically removing the entire viscera of a fowl which is compact and occupies very little of the conveyor line space in a chicken processing line.

Still another important object of the present invention is to provide an apparatus and method for automatically removing the entire viscera from a chicken after the viscera has been processed which includes a special gripping device which positively clamps the viscera section between the stomach and crop without letting the tract slide so that the entire remaining viscera is pulled out and completely separated and removed from the body of the chicken.

Yet another important object of the present invention is to provide apparatus and method for removing the entire viscera from a fowl in a fowl processing line wherein a plurality of radially mounted gripping devices which positively clamp the viscera tract are rotated in a circular path which is inclined to the horizontal such that the gripping devices are successively brought into operational alignment with fowl carcasses successively conveyed past the gripping devices.

Yet a final important object of the present invention is to provide a method and apparatus for automatically removing the entire viscera completely from a fowl which includes a gripping device having a contoured surface permitting the device to insert easily into a vent opening of the fowl and means for reciprocating the gripping device in and out of the carcass of the fowl during separation.

SUMMARY OF THE INVENTION

The above objectives are accomplished according to the present invention by providing a plurality of gripping devices having a pair of gripping jaws with a first closed position for clamping a desired section of the tract of the viscera and an open position in which the viscera tract is released. There is a frame arranged at a fixed location adjacent the fowl conveyor and there is a rotating hub structure rotatably carried by the frame. A plurality of radial elongated spoke arms extend outwardly from the hub and there is a gripping device carried on the end of each radial spoke arm. By mounting the hub member and radial spoke arms in a plane inclined to the vertical plane passing through the line of conveyance of the fowl carcasses, the gripping devices are rotated in a circular path such that they are brought sequentially into an operational position at the lowermost point of their travel in synchronization with the passage of the fowl carcasses conveyed past the location. In this manner, the radially mounted gripping devices are inserted and retracted from the fowl carcasses as they are conveyed successively past the location of the rotating hub and gripping devices. At the lowermost point of travel where the gripping device penetrates into the fowl cavity by its fullest extent, the gripping jaws are closed upon the tract section of the viscera between the stomach and crop. This is one of the toughest sections of the tract and the gripping devices clamp tightly without slippage from the tract and pull it from the fowl carcass to completely separate it as the gripping device turns with the rotary hub. Once the gripping device and viscera section are clamped thereby are completely removed from the fowl carcass, a notch plate catches the viscera almost simultaneously with the gripping jaws being opened such that the viscera is completely released from the gripping device. Cam actuator means are synchronized with the rotation of the gripping devices to close and open the gripping jaws in synchronization with the insertion and retraction with the gripping jaws in the fowl carcasses.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to an apparatus and method for harvesting the viscera from a fowl being processed along a food processing line of the type having an overhead fowl conveyor. The fowl is normally suspended in an inverted position with a vent opening of the fowl facing upwards.

Referring now in more detail to the drawings, a frame means is arranged at a fixed location adjacent the conveyor of the food processing line. There is provided a plurality of gripping means A having a closed position for tightly clamping a desired section of the tract of the viscera generally without slippage. The gripping means has a second, open position in which the viscera tract is released. Carrier means B which is rotatably mounted on the frame means is provided for carrying the gripping means A. Insertion means C for moving the gripping means to a viscera clamping position inside an interior cavity of the fowl is provided. Carrier means B moves the gripping means a predetermined lateral distance along with the fowl while it is being conveyed and the gripping means is inserted in the fowl. Actuator means are provided for moving the gripping means from the open position to the closed position while the gripping means is inserted in the fowl cavity whereby the viscera section is clamped. Means C also provides for retraction of the closed gripping means A so that the viscera section is pulled away from and completely separated from the carcass of the fowl. The actuator means moves the gripping means to the open position after retraction of the gripping means from the fowl so that the separated viscera is released.

As illustrated, gripping means A includes a pair of metal gripping jaws 10 and 14. There are serrations 16 formed in the gripping jaws transverse to the longitudinal axis of the insertion and retracting means C. The serrations extend transverse to the section of track 18 of the viscera about which the gripping jaws clamp when closed.

Figures 3, 4:
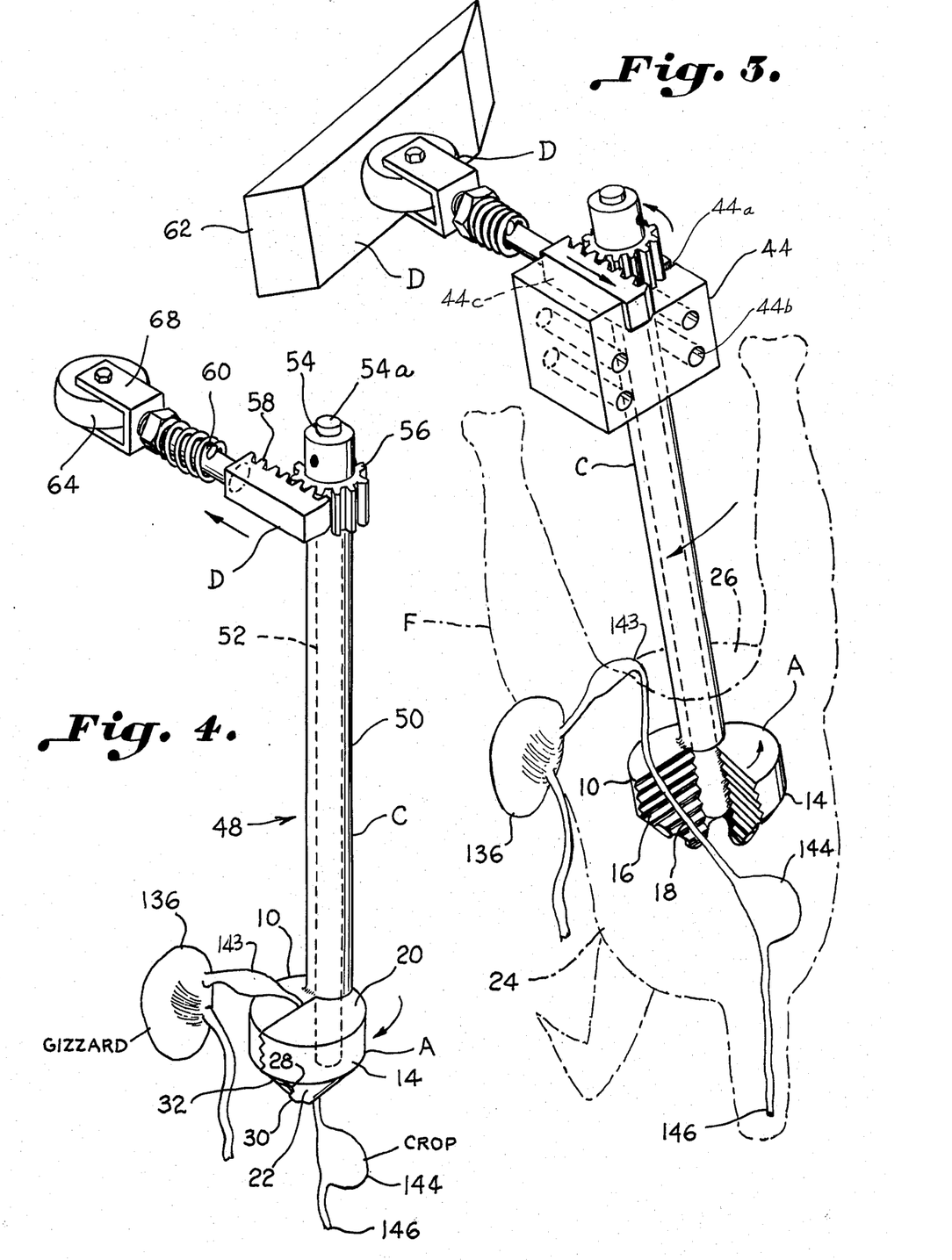
FIG. 3 is a perspective view illustrating a gripping device for tightly clamping a tract section of a viscera inside the interior cavity of a fowl constructed according to the present invention.
FIG. 4 is a perspective view illustrating a gripping device and actuator therefor wherein the gripping device is in a closed position tightly clamping a section of the tract of a viscera.

The gripping jaws in their closed position, as can best be seen in FIG. 4, define a contoured body which includes a short cylindrical section 20 and a tapering conical section 22 which is rounded and smooth and tapers generally to a point in the direction of insertion into an interior cavity 24 of a fowl F through a vent 26. The leading edge of the contoured body portion is thus rounded and devoid of any sharp edges as would tear the fowl carcass and render it a second grade bird.

Included as part of the clamping action of the gripping jaws is a lip means 28 and 30 which consist of overlapping metal lips which close a narrow slit 32 between the gripping jaws as would allow the viscera tract 18 to slide radially out of the gripping jaws. By radially it is meant in a direction which is radial to the longitudinal axis of the insertion means C. Since the serrated teeth 16 clamp the viscera section 18 positively in the jaws and the tract section is prohibited from sliding radially out of the jaws, the viscera is effectively pulled out of and separated from the chicken carcass. This is particularly important since the viscera tract section is extremely slippery and hard to grasp.

The carrier means B includes a rotary hub designated generally as 34 which is carried about a rotary axis 35. The rotary hub includes a face plate 36 and a back plate 38. The back plate includes a shroud 40 encircling the plate and attached thereto. The plate 38 is affixed to a rotating drive shaft 42 of a synchronized rotary drive means E which will be more fully explained hereinafter. Affixed to and between the plates 36 and 38 is a plurality of mounting blocks 44. These blocks are split at 44a and are preferably of a high molecular weight plastic and are fastened to the plate 34 by any suitable means such as by bolts. The blocks space the plates from one another.

Stabilizing means for insuring reliable rotation of the carrier B and gripping means A is provided by gear teeth 38a formed around the circumference of plate 38. Meshing with the teeth 38a is a small spur gear 46 carried on the end of a shaft 46a which is journaled in bearing blocks 46b fixed to a housing 46c. The remote end of shaft 46a carries a weight plate 47 which is weighted sufficiently that any slack or play is taken out of the rotation of the hub 34 as may be carried by the driving thereof through chains, sprocket and gearing.

Means for inserting and retracting the gripping devices A includes a plurality of elongated spoke arms or members designated generally as 48 fixed to the rotary hub 34 and extending outwardly therefrom. Each elongated spoke arm includes a hollow shaft 50 having an interior bore 52 in which a drive rod 54 is rotatably carried. The shaft 50 is received in the split mounting block 44 and affixed tightly therein by means of closing the split by bolts (not shown) received in bolt holes 44b. These same bolts may be used to fasten the block between the plates.

The inward end of the drive rod 54 includes a gear 56 affixed thereto which meshes with a rack gear 58 carried on a reciprocating rod 60 for rotating the gear 56 and hence the rod 54. As can best be seen in FIG. 3, rack gear 58 is guided by a face 44c of the mounting block 44 and held in sliding position.

The remote end of the rod 54 has affixed to it one of the gripping jaws 14. The other of the gripping jaws is stationary and affixed to the shaft 50. It is to be understood, of course, that it could also be provided that both of the gripping jaws are rotated. A spring 61 abuts a nut on one end and the other end of the spring abuts plate 38 in which the rod 60 is reciprocatingly received. Spring 61 biases the rod 60 away from plate 38. Spring 61 biases the jaws 10, 14 into their closed, clamping position as it is released from a compressed state between the nut and plate 38.

The actuating means D for moving the gripping jaws to an open position is illustrated in the form of a cam means 62, 63, 64. There is a short lower cam plate 62 and a long upper cam plate 63 which is somewhat longer than cam plate 62. Both cam plates are utilized for opening gripping jaws 10, 14 at various times in the operation. Cam plate 62 is carried by a stationary arm 62 affixed to gear box 97 at about a five o'clock position.

The cam plate has a sloping surface leading up to and on to the main short flat body of the cam plate.

A cam engagement means 64 includes a cam roller wheel which is carried by a wheel bracket 68. The wheel bracket is affixed to the reciprocating rod 60 such that as the wheel rides up onto the cam plate 62. The rod 60 is pushed outwardly turning the gripping jaw 14 through the gear 56 and rack 58 to its open position. This occurs after the gripping means is inserted into the cavity 24 of the fowl. The wheel rolls off of the cam plate 62 at about a six o'clock position and the spring, being compressed, is released to snap the jaw 14 closed and clamp the viscera tract 18 between the jaws 10, 14. Opening occurs inside the cavity from about the five to six o'clock interval. During this time, the jaws 10, 14 open and push against the sides of the cavity and the viscera tract is left extending through the center of the cavity, which, in effect, has been opened by the spreading apart of the jaws. The viscera tract 18 is properly positioned for being gripped.

Figure 5:
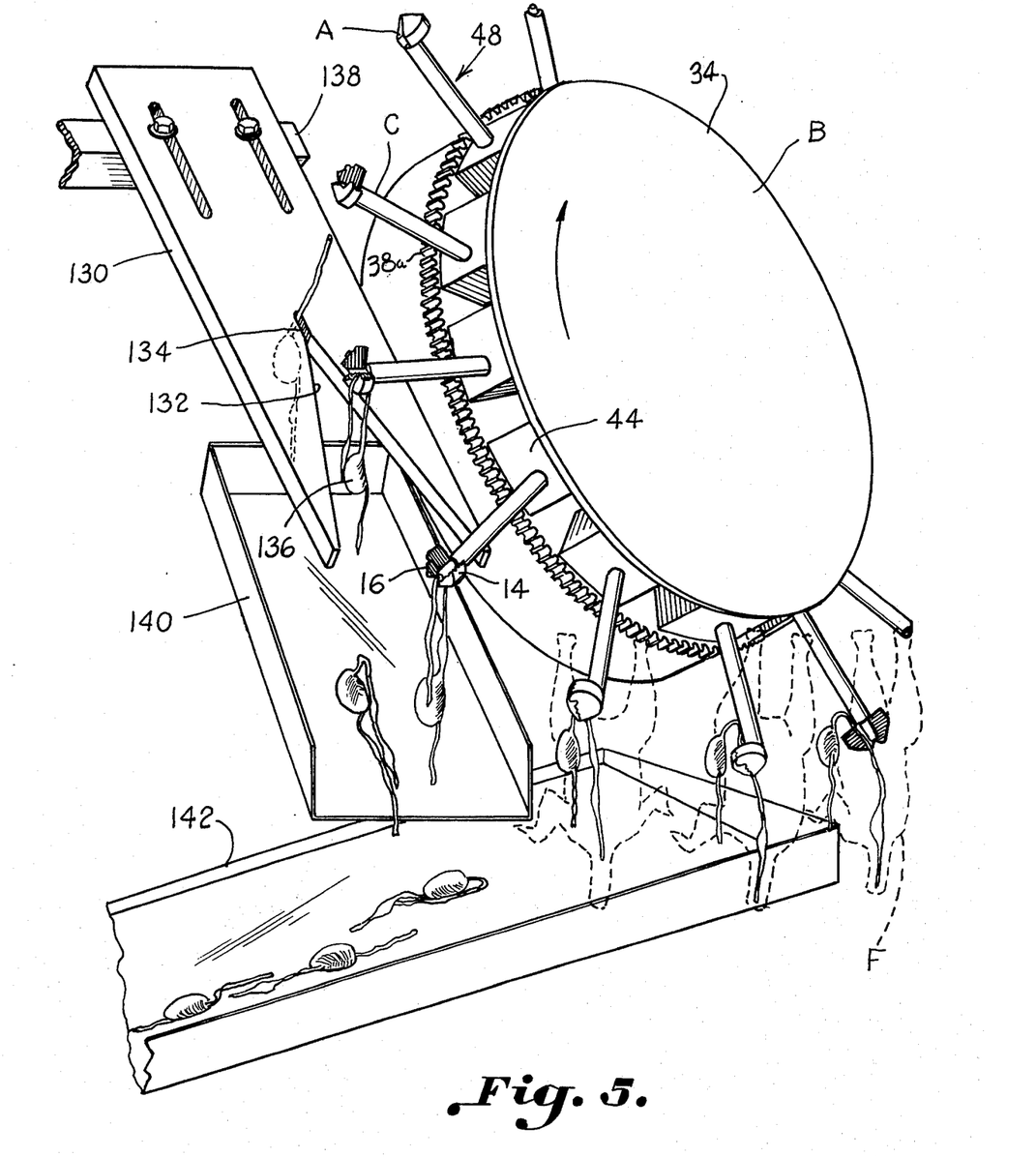
FIG. 5 is a perspective view illustrating an apparatus and method for automatically inserting and retracting a viscera clamping device into a fowl cavity as a plurality of fowl carcasses are successively conveyed past the apparatus for completely separating the viscera from the fowl carcass.

The cam plate 63 is carried on support plate 80 by arm 63a at about a nine o'clock position. This cam opens the jaws by again pushing the rod 60 outwardly against spring 61. This opening occurs to release the viscera which has been removed from the fowl carcass by the gripping and retraction of gripping devices A vis spoke arm 48. To ensure release of the viscera, the cam plate 63 includes an elongated plateau over which the jaws 10, 14 are held open. Opening begins at about an eight o'clock position and continues over to about a ten o'clock position to ensure this release which can best be seen in FIG. 5. For this purpose, the flat of cam 63 is elongated.

A frame 70 is illustrated which is arranged at a fixed location along the conveyor of the fowl food processing line. Frame 70 may be any suitable frame structure for providing a base for the rotating carrier means B. The frame includes an upper base 72 to which the carrier means B is directly attached by means of a pivot shaft 74 which is received through pivot bracket 76 carried on base 72 and a pivot bracket 78 carried on the back of a main support plate 80 which carries the rotating hub structure.

A pair of adjustments are provided so that the hub may be aligned for penetrating engagement of the fowl carcass F. A first screw rod connector 82 is provided which is received in a threaded coupling 84 carried by base 72. One end of the thread rod 82 is pivotably attached at 86 to a block or a plate 88 affixed to a back side of support plate 80. The opposite end of rod 82 includes a knob 90 by which it may be rotated.

A bracket 92 extends from plate 88 and includes a threaded journal 92a which receives a second threaded adjustment rod 94. One end of adjustment rod 94 is rotatably journaled in a plate 95 attached transversely to a frame 96. The frame 96 includes a pair of outwardly turned angle iron members between which is affixed a drive box 97 which includes conventional ninety-degree drive gearing. Conventional reduction gearing may also be utilized if necessary to synchronization. Turning of a knob 98 causes the rod 94 to rotate in the threaded journal 92a and move frame 96 in the direction of either arrow shown on the drive box 97. Stabliizing housing 46c is affixed to frame 96 and moves with the frame. Frame 96 may be slidably mounted on plate 80 by any suitable means. For this purpose, block 96 may include horizontal angle iron flanges 96a which fit in grooves 80a of side plates 80b of the main support plate 80.

Housing 97 is affixed between the vertical flanges 96b of the angle iron members. Grooves 80a may be machined in plastic blocks mounted to the upstanding side plates 80b of the support plate 80 which has a generally square C-shape horizontal configuration.

An input shaft 100 of the drive box 97 is connected by way of a universal joint 102 to a rotating shaft 104 which is connected by a second universal joint 106 to a drive shaft 108 which is, in turn, driven by a chain and sprocket assembly 110. The chain and sprocket drive assembly 110 is connected to a conveyor drive shaft 112 which drives a chain 113 which moves the support shackles. Thus, the drive to the drive box 97 is synchronized with the drive of the conveyor such that the rotation of carrier B and operation of the apparatus herein is synchronized with the fowl conveyor.

The conveyor on the food processing line is a conventional overhead conveyor and includes a conveyor rail 114 over which a rider bracket 116 rolls. Suspended from the bracket 116 is a shackle support 117 on which a fowl carrying shackle 118 is carried. The fowl carcass F is suspended from the shackle 118 in a conventional manner as illustrated. The fowl F is conveyed in the direction of the arrow 120.

It can now be seen that the means for inserting and retracting the gripping means A through the vent 26 of the fowl into the interior cavity for clamping the viscera is provided by the carrier means and rotating spoke arms 49. The spoke arms as carried radially extending on the rotating hub 36 travel in a circular path in a plane inclined to a vertical plane passing through the line of conveyance of the fowl, which inclination is designated generally as angle, a. By adjusting the screw rod 82 the rotary hub 36 may be brought into such an angle with the conveyor line that adjacent rotating arms 48 successively enter adjacent fowl carcasses successively conveyed past the rotary hub.

Figure 2:
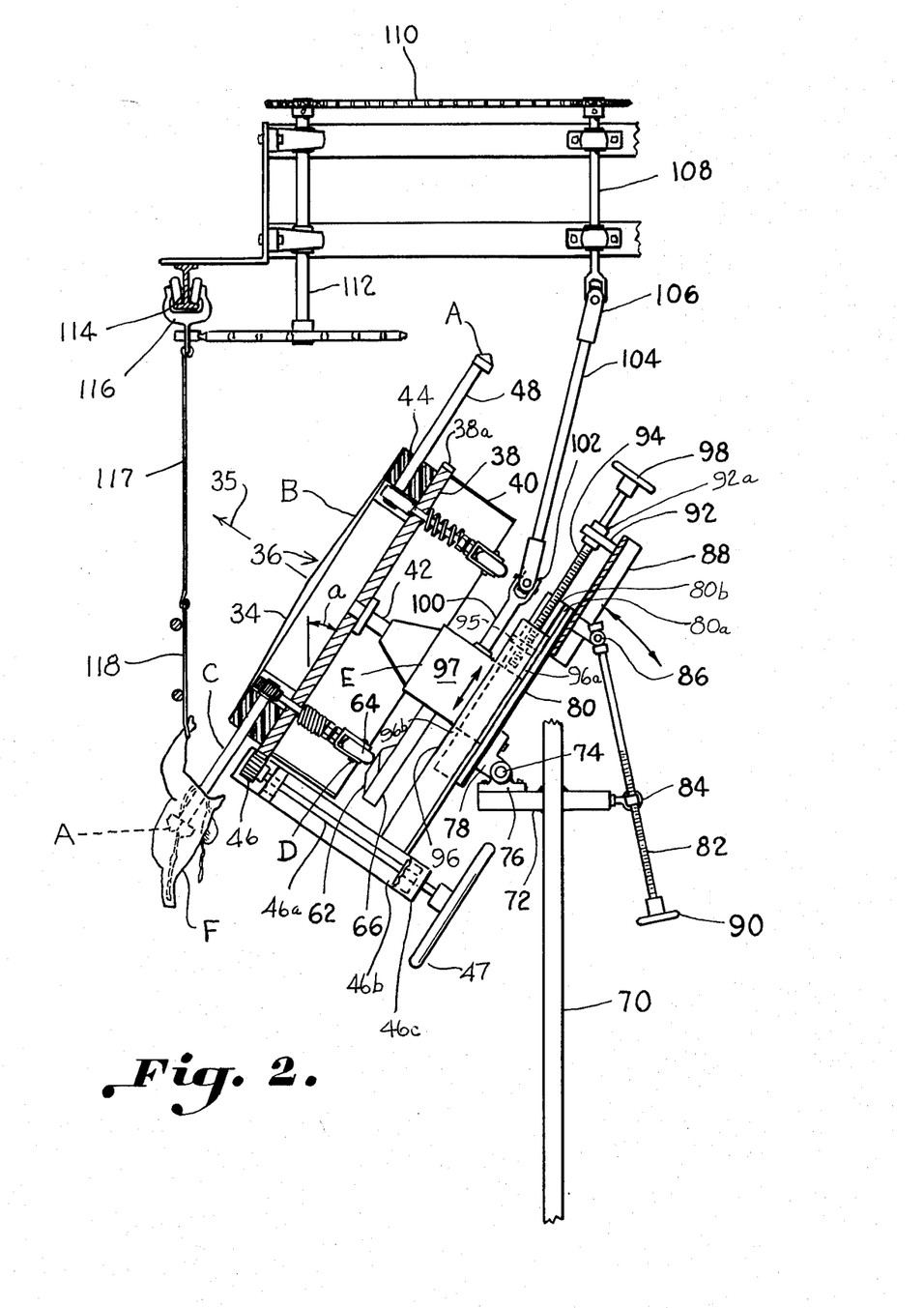
FIG. 2 is a sectional side view illustrating apparatus and method for harvesting a viscera from a fowl carcass being conveyed in a fowl processing food line.

The gripping devices A carried on the spoke arms 48 travel from a six-o'clock lowermost operational position to a twelve-o'clock uppermost point, as can best be seen in FIG. 2. At the lowermost operational point the gripping device extends into its furthermost extent into the fowl cavity wherein it is properly positioned to clamp the track section 18 of the viscera which is desired to be clamped. Adjustment of screw rod 94 generally adjusts the depth of penetration so that this track section may be reached and clamped at the lowermost position.

Adjacent spoke arms 48 rotate to insert and retract a gripping device A radially into the cavity 24 of the successively adjacent fowls being conveyed past the rotary hub to penetrate the vent 26 sequentially and then grip and retract. The synchronized drive means E which is driven off of the conveyor drive 112 provides synchronization of the rotating gripping means A with the fowl passing by the conveyor such that adjacent spoke arms enter adjacent chickens sequentially in processing order. It will also be seen that the rotating hub and spoke arms provide a predetermined lateral movement of the gripping device A. While the gripping device A is in the fowl cavity 24, it thus moves laterally with the fowl being conveyed overhead.

A device for catching the viscera when it is removed from the fowl carcass is provided in the form of a notch plate 130 which includes a V-shaped notch 132 which tapers into a narrow slot 134. As the viscera is carried by the gripping means A upward after being retracted from the fowl cavity, a gizzard 136 is caught in the slot 134 to positively pull and release the viscera from the gripping means. The catch plate 130 may be fastened to a frame element 138 which may be fixed to the remaining part of the frame of the apparatus of the invention or the conveyor.

A drop box 140 catches the harvested viscera and drops it into a chute 142 wherein the viscera is washed away.

Thus, it can be seen that an advantageous construction can be had for apparatus which automatically enters an interior cavity of a fowl and positively clamps a desired section of the viscera track in the cavity. The device then retracts from the cavity and pulls the viscera without slippage completely out and away from the poultry carcass. This step in the food process is carried out after the viscera has been pulled from the fowl cavity and left hanging exteriorly for inspection and for harvesting of the liver. In the inspection position the viscera remains attached to the fowl. This then automates the final step of completely separating the viscera from the fowl which has heretofore been done by manually grasping the viscera and cutting it to remove it from the fowl. This necessitates that the crop be removed in a subsequent step.

According to the present invention, the viscera including the crop, is pulled positively from the chicken carcass in one step. This is possible because the gripping device A is designed to grasp a section 18 of the viscera which is a very tough section of the track between the stomach 143 and crop 144. This is generally the toughest tract section and it has been found that the entire viscera may be pulled loose by clamping and pulling this section. The end 146 of the viscera which is normally left attached to the carcass is pulled free by the device in accordance with the apparatus and method of the present invention in a reliable manner.

By rotating the gripping devices A on a rotary spoke wheel, a minimum amount of space on the conveyor processing line is taken up by the apparatus and process of the present invention. The rotary carrier B provides the means and function of insertion of the gripping device A into the cavity of the fowl through its vent, a slight lateral movement of the gripping means A in the direction of conveyance while the grippiing device A is being closed and clamped upon the viscera, and then retraction of the gripping device A.

Figure 1:
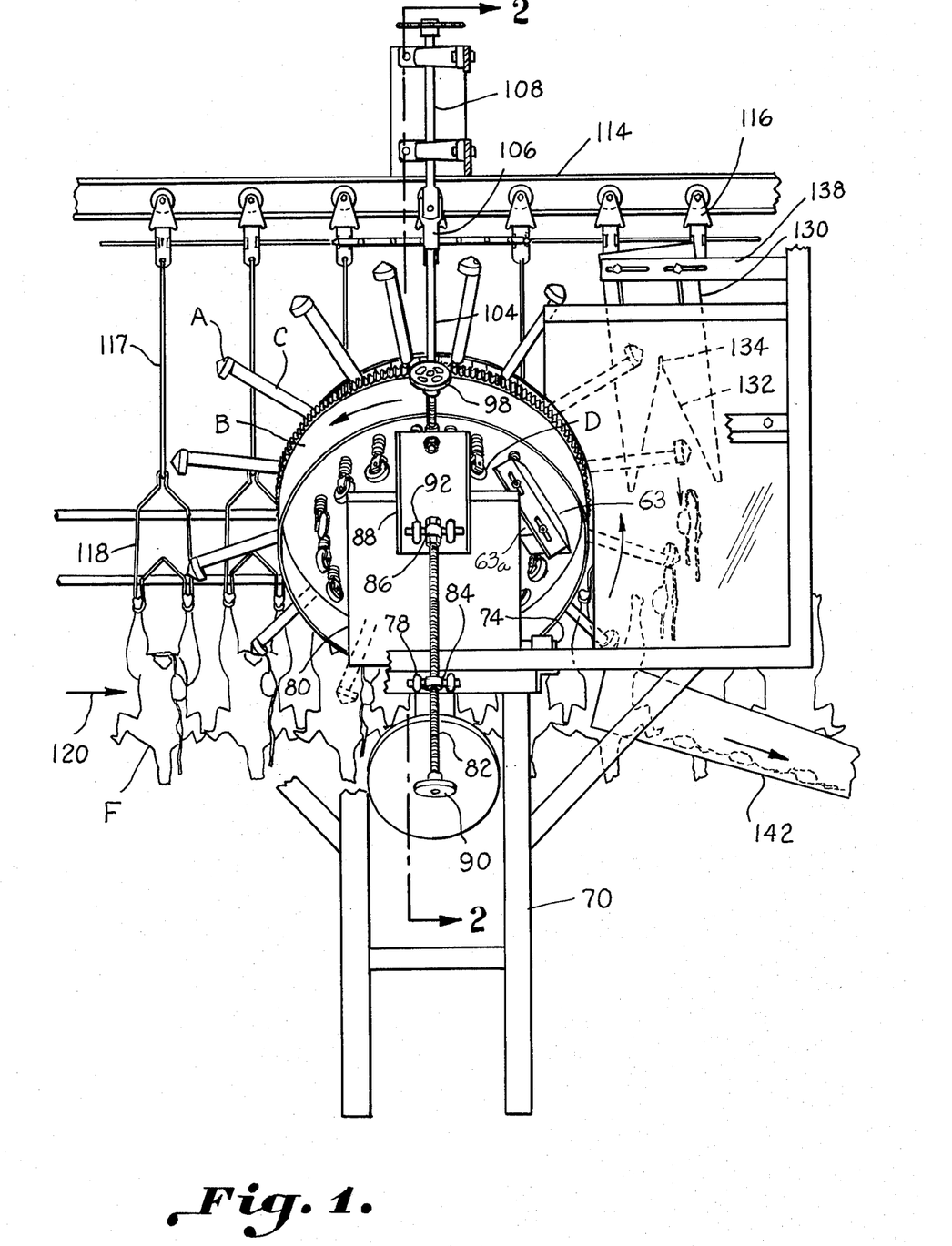
FIG. 1 is an isometric view illustrating an apparatus and method for harvesting by complete separation the viscera from a fowl carcass being processed on an overhead conveyor of a food processing line.

As can best be seen in FIG. 1, the gripping device A first begins to enter the cavity of the fowl at about a four-o'clock position prior to opening of the gripping jaws at the five-o'clock position on the circular cycle path. As fowl F approaches the six-o'clock position in front of the rotary hub, the gripping device A penetrates into its furthermore position in the fowl cavity adjacent the area of the track section which is desired to be clamped. The gripping device A begins retracting from the cavity at about a seven-o'clock position after clamping the viscera positively after coming off cam 62 at about the six-o'clock position. When the arm 48 begins to leave the cavity and when it is rotated approximately a few degrees to about the eight-o'clock position, the gripping means A has cleared the flow. Subsequently, the jaws are opened from about eight to ten o'clock by cam 63.

While the invention has been illustrated with gripping devices A on the ends of radial spoke arms C, it is to be understood that other fowl processing inplements may be carried by carrier hub B on the arms such as sprayers, cutting tools, eviscerators, etc.

While a preferred embodiment of the invention has been described using specific terms, such description is for illustrative purposes only, and it is to be understood that changes and variations may be made without departing from the spirit or scope of the following claims.

What is claimed is:

1. Apparatus for harvesting the viscera from a fowl being processed along a food processing line of the type having an overhead fowl conveyor from which said fowl is suspended in an inverted position with an upward facing vent, said apparatus comprising:
    (a) frame means arranged at a fixed location adjacent said conveyor line;
    (b) gripping means having a closed position for tightly clamping a desired section of said viscera generally without slippage and an open position in which said viscera section is released;
    (c) carrier means carried by said frame means for carrying said gripping means;
    (d) insertion means operatively connected to said gripping means for moving said gripping means to a viscera clamping position inside an interior cavity of said fowl;
    (e) said carrier means moving said gripping means a predetermined lateral distance generally in the direction of fowl conveyance along with said fowl while said gripping means is inserted in said fowl;
    (f) actuator means for moving said gripping means from said open position to said closed position while inserted in said fowl cavity for clamping said viscera of said fowl;
    (g) retraction means operatively connected to said gripping means for retracting said closed gripping means so that said viscera is completely separated and removed from said carcass of said fowl;
    (h) said actuator means moving said gripping means to said open position after retraction of said gripping means from said fowl to release said viscera;
    (i) said carrier means including a rotating hub means carried by said frame means at said fixed location adjacent said fowl conveyor;
    (j) radical connector means carrying said gripping means extending radially outwardly from said rotating hub; and
    (k) mounting means for rotatably mounting said hub means adjacent said fowl conveyor so that said radial connector means are rotated in a plane inclined to the horizontal to bring adjacent radially carried gripping means into penetrating alignment with fowl carcasses passing successively by said rotating hub means.

2. The apparatus of claim 1 including:
    said radial connector means including a plurality of elongated radial spoke arms carried by and extending radially from said rotating hub means;
    said gripping means being carried adjacent a free end of each said spoke arm; and
    drive means synchronizing rotation of said hub means to align adjacent spoke arms with adjacent fowl passing successively past said hub means for insertion and retraction of said spoke arms in said vent of said fowl sequentially.

3. The apparatus of claim 2 including:
    a radial bore formed in each said elongated spoke arm;
    said gripping means including a pair of gripping jaws at least one of said jaws being movable towards the other from an open position to said closed gripping position;

said actuator means operating through said bore to move said movable gripping jaw between said open and closed positions.

4. The apparatus of claim 3 wherein said actuator means includes a rotating shaft rotatably carried in said bore of said spoke arm, said movable gripping jaw being carried on one end of said shaft; and said actuator means rotating said shaft to alternately move said movable gripping jaw from said open position to said closed gripping position in response to the rotation of said hub means.

5. The apparatus of claim 1 wherein said gripping means includes:
a pair of gripping jaws; and
said actuator means connected to at least one of said gripping jaws for moving said gripping jaw toward the other to a closed gripping position in synchronization with the penetration of said gripping means into the cavity of said fowl.

6. The apparatus of claim 5 including:
cam means carried by said frame means adjacent said rotary hub means;
cam engagement means included in said actuator means actuated by said cam means in response to the rotation of said hub means whereby said gripping jaws are opened and closed.

7. The apparatus of claim 5 wherein said gripping jaws include serrated teeth formed tranversely in said gripping jaws transverse to the section of said viscera being gripped between said jaws.

8. The apparatus of claim 5 wherein said gripping jaws are formed as part of a contoured body such that when said gripping jaws are closed the forward end of said gripping jaws in the direction of fowl insertion define a smooth tapering contoured end for being receivable through the vent opening of said fowl smoothly generally without tearing.

9. The apparatus of claim 5 wherein said gripping jaws include lip means carried adjacent said contoured end to prevent said viscera section from slipping from said jaws in a radial direction.

10. The apparatus of claim 5 including:
a plurality of elongated radial spoke arms carried by said carrier means in a circumferentially spaced manner;
drive means for rotating said spoke arms;
said pair of said gripping jaws being carried adjacent a free end of each said elongated spoke arm;
a hollow bore formed in each said radial spoke arm;
a shaft rotatably received in said hollow bore which is connected to one of said gripping jaws; and
cam means operatively connected to an opposing end of said shaft for rotating said shaft and gripping jaw to between open and closed positions in synchronization with the rotation of said elongated arm; and
adjacent ones of said elongated spoke arms penetrating said vent and said interior cavity of adjacent fowl carcasses successively on said conveyor providing said means for inserting and retracting said elongated arm into said fowl.

11. The apparatus of claim 1 wherein said means for inserting said retracting said gripping means includes:
a rotating hub means having a central drive axis about which said hub means is driven;
a plurality of elongated radial spoke arms extending radially outwardly from said rotating hub means;

said gripping means being carried adjacent the end of each said rotating spoke means; and
said gripping means carried on ends of elongated spoke arms on said rotating hub means rotating in the direction of said fowl on said overhead conveyor so that said gripping means is inserted and retracted in synchronization with said fowl moving on said overhead conveyor.

12. The apparatus of claim 1 including catch means for engaging said viscera whereby it is positively pulled from said gripping jaws upon opening of said gripping jaws after retraction from said fowl.

13. The apparatus of claim 12 wherein said catch means includes a notched plate mounted stationarily to catch said viscera as said gripping means moves past said stationary catching means to positively withdraw said viscera from said gripping means.

14. A method for processing the viscera of a fowl carcass being processed on a conveyor comprising:
providing a plurality of gripping devices for grasping said viscera;
rotating said gripping devices in a generally circular motion in an inclined generally circular path having an upper portion and a lower portion at a fixed location adjacent said conveyor;
inserting said gripping devices into an interior cavity of said fowl carcasses at said lower portion of said circular path by said circular motion sequentially in synchronization with the passages of said fowl carcasses conveyed past said location;
grasping said viscera with said gripping devices while inserted in said fowl carcass;
retracting said gripping devices from said fowl carcasses by said circular motion as said gripping device moves away from said lower portion towards said higher portion so that said viscera is pulled from said fowl carcass; and
releasing said viscera from said gripping device after said retraction of said gripping device.

15. A method for removing the viscera from a carcass of a fowl being processed for food wherein said fowl has been cut to form a rear vent opening for access to said viscera and said fowl is suspended from an overhead fowl conveyor in an inverted position with said vent opening being facing upwardly, said method comprising:
providing a plurality of gripping devices having a closed position in which a desired section of said viscera is tightly clamped generally without slippage and an open position in which said viscera section is released;
mounting said gripping devices at a location adjacent said fowl conveyor;
rotating said gripping devices in an inclined generally circular path having a low portion and a high portion;
inserting adjacent ones of said gripping devices at said low portion by circular motion successively in said interior cavity of successive fowl carcasses being conveyed on said conveyor generally adjacent said desired viscera section;
closing an inserted gripping device about said viscera section when said gripping device reaches a gripping position in said fowl carcass;
retracting said closed gripping device by circular motion away from said low portion and towards said high portion so that the viscera is pulled and completely separated from said fowl;

opening said gripping device once said gripping jaws are removed from said fowl and releasing said removed viscera exteriorly of said fowl; and automating said circular movement of said gripping devices so that said insertion and retraction of said successive gripping devices are synchronized with the conveyance of fowl carcasses passing thereby to penetrate said carcasses sequentially.

16. The method of claim 15 including:

providing a pair of gripping jaws in each said gripping device;

moving at least one of said gripping jaws toward the other when reaching said lowermost position to clamp and grip said viscera section between said jaws.

17. The method of claim 15 including:

providing a pair of gripping jaws in each said gripping device having a closed clamping position in which said viscera section is tightly clamped generally without slippage and an open position in which said viscera section is released.

18. The method of claim 15 including mounting said gripping devices to move in a circular path in a plane inclined to the horizontal such that they successively penetrate adjacent fowl carcasses being conveyed successively past said location.

19. A method of separating and removing a viscera from a fowl carcass being processed on a conveyor comprising:

providing a plurality of gripping devices for grasping said viscera;

rotatably mounting said gripping devices on a frame arranged at a fixed location adjacent said conveyor;

rotating said gripping devices in a generally circular path of travel in a plane inclined to the horizontal so that said gripping devices rotate radially toward said fowl carcasses conveyed past said fixed location;

inserting said gripping devices generally radially into an interior cavity of said fowl carcass sequentially in synchronization with the passage of said fowl carcasses conveyed past said location;

grasping said viscera section with said gripping devices while inserted in said fowl carcass;

retracting said gripping devices generally radially from said fowl carcass;

releasing said viscera from said gripping devices after retraction of said gripping devices and passage of said fowl carcass;

providing a rotating hub carried on said frame having a rotary axis inclined to the horizontal and a plurality of elongated radial spoke arms extending radially therefrom; and mounting said gripping devices on the end of each of said radial spoke arms so that said gripping device penetrates said interior cavity to a desired gripping position during travel in said circular path on said rotating hub.

20. The method of claim 19 including:

providing said gripping devices in the form of a pair of gripping jaws arranged on said elongated spoke arm to be closable on said viscera section;

providing means carried by said elongated spoke arm for moving at least one of said jaws between open position and said closed positions.

21. The method of claim 19 wherein said gripping device includes a pair of gripping jaws having a closed position in which said viscera section is tightly clamped and an open position in which said viscera section is released.

22. Apparatus for processing fowl carcasses being conveyed along a line of conveyance on a fowl conveyor comprising:

a frame arranged at a fixed location adjacent said fowl conveyor;

a rotary hub rotatably carried by said frame having a rotary axis about which said hub rotates;

a plurality of radial elongated spoke arms extending outwardly from said hub;

fowl processing devices carried adjacent the end of said spoke arms rotating with said hub in a generally circular motion in a generally circular path lying in an inclined plane for performing a desired processing operation on said fowl carcass;

said fowl processing devices travelling in said circular path on said rotary hub to an operational position at a lower portion of said circular path sequentially in alignment with fowl being conveyed post said frame for processing engagement with said fowl; and synchronized drive means for rotating said hub so that successive ones of said processing devices are brought by said circular motion into said operational position for engagement with successive ones of said fowl carcasses in sequence.

23. The apparatus of claim 22 wherein said rotary axis of said rotary hub is inclined to a vertical plane passing through the line of conveyance of said fowl whereby said processing devices are brought into alignment with said fowl carcasses.

24. Apparatus for removing a viscera from a fowl carcass being processed on a fowl conveyor comprising:

a plurality of gripping devices for grasping said viscera;

rotating means for rotatably mounting said gripping devices on a frame arranged at a fixed location adjacent said conveyor;

said means for rotatingly mounting said gripping devices rotating said gripping devices in a generally circular path lying in a plane inclined to the horizontal so that said gripping devices rotate generally radially toward said fowl carcasses conveyed past said location;

said rotating means inserting successive ones of said gripping devices at a lower portion of said circular path generally radially into an interior cavity of successive ones of said fowl carcasses sequentially in synchronization with the passage of said fowl carcasses conveyed past said location;

means operating said gripping device for grasping said viscera while inserted in said fowl carcass;

said rotating means rotating said gripping device upwards from said lower portion for retracting said gripping devices generally radially from said fowl carcass so as to cause said viscera to separate completely from said fowl carcass; and means for releasing said viscera from said gripping device after retraction.

25. Apparatus for harvesting the viscera from a fowl being processed along a food processing line of the type having an overhead fowl conveyor from which said fowl is suspended in an inverted position with an upward facing vent, said apparatus comprising:

(a) frame means arranged at a fixed location adjacent said conveyor line;

(b) gripping means for grasping said viscera for removal from said fowl carcass;

(c) carrier means carried by said frame means for carrying said gripping means;

(d) insertion means operatively connected to said gripping means for moving said gripping means to a viscera gripping position inside an interior cavity of said fowl;

(e) retraction means operatively connected to said gripping means for retracting said gripping means so that said viscera is pulled from said carcass of said fowl;

(f) release means releasing said viscera from said gripping means after retraction;

(g) rotating hub means having a central drive axis;

(h) said insertion and retraction means including a plurality of elongated penetrating spoke members carried by said hub extending radially outwardly from said hub means;

(i) mounting means for mounting said rotating hub means on said frame means at a horizontal inclination adjacent said fowl conveyor with said elongated spoke members in penetrating alignment with said fowl vent opening; and (j) drive means rotating said hub means in synchronization with said fowl conveyor so that adjacent elongated spoke members penetrate successively conveyed fowls to insert and retract said gripping means carried on adjacent spoke members sequentially with fowl carcasses conveyed past said rotating hub means.

26. Apparatus for separating and removing viscera from a carcass of a fowl being conveyed in an inverted position with a vent of said fowl facing upwards on a food processing conveyor comprising:

a frame fixed adjacent said conveyor;

an elongated shaft having a longitudinal axis;

a plurality of said shafts carried on said frame;

a gripping device having a pair of rotating gripping jaws carried adjacent an end of each said elongated shaft;

at least one of said gripping jaws being rotatably mounted on said shaft for rotation about a longitudinal axis of said shaft so that opposing gripping jaws close against each other;

said gripping jaws having a closed position in which said viscera section is tightly clamped between said gripping jaws and an open position in which said viscera is released from said gripping jaws;

actuator means acting for rotatably moving said gripping jaws between said open and closed position;

a contoured semi-conical end formed on each said gripping jaws providing a smooth generally solid continuous conical surface when said gripping jaws are closed, said solid conical surface tapering toward a point facilitating insertion through said vent when said jaws are closed with reduced tearing of said fowl carcass; and means for automatically inserting and retracting said gripping devices in and out of said fowl carcasses and automatically actuating said gripping jaws in synchronization with the conveyance of said carcasses past said frame.

27. The apparatus of claim 26 including lip means carried by said jaws preventing slippage of said viscera radially out of said jaws.

* * * * *